United States Patent [19]
DeMars

[11] Patent Number: 5,522,306
[45] Date of Patent: Jun. 4, 1996

[54] TOASTER AND CUTTER

[76] Inventor: Robert A. DeMars, 5000 N. Parkway Calabasas - Suite 233, Camarillo, Calif. 91302

[21] Appl. No.: 445,702

[22] Filed: May 22, 1995

[51] Int. Cl.⁶ .................................................. A47J 37/08
[52] U.S. Cl. .......................... 99/329 RT; 99/355; 99/357; 99/385
[58] Field of Search ................. 99/385, 329 RT, 99/329 R, 335, 327, 352, 355, 357, 373, 387, 388, 449

[56] References Cited

U.S. PATENT DOCUMENTS

| | | | |
|---|---|---|---|
| 1,836,538 | 12/1931 | Lofgren et al. | 99/335 |
| 1,888,992 | 11/1932 | Lofgren et al. | 99/329 RT |
| 2,552,135 | 5/1951 | Bertino | 99/329 RT |
| 2,644,392 | 7/1953 | Foster | 99/329 RT |
| 3,416,430 | 12/1968 | Hauser | 99/332 |
| 3,670,642 | 6/1972 | Bergman | 99/329 RT |
| 3,824,915 | 7/1974 | Capucio | 99/329 RT |
| 4,261,257 | 4/1981 | Henderson et al. | 99/386 |
| 4,454,803 | 6/1984 | Wolf et al. | 99/329 RT |
| 4,530,276 | 7/1985 | Miller | 99/386 |
| 4,651,634 | 3/1987 | Barton | 99/332 |
| 4,791,862 | 12/1988 | Hoffmann | 99/385 |

*Primary Examiner*—David Scherbel
*Assistant Examiner*—James F. Hook
*Attorney, Agent, or Firm*—Jack C. Munro

[57] ABSTRACT

A toaster (10) for toasting bagels, muffins, bread slices and other similar foodstuff (18 and 126), where the foodstuff (18 and 126) is inserted within an access opening (14) in the top of the toaster (10) onto a holding rack (186, 188), and the toasted foodstuff (18, 126) is then automatically exited through an exit opening (26) located in the bottom area of the toaster (10). Associated with the exit opening (26) is a planar member (30) which has a work surface (28) upon which the toasted foodstuff (18, 126) is to be deposited. The planar member (30) is to be pivotally mounted on the toaster housing (12) to move between a stowage position and a usage position. A safety protected foodstuff cutter (36) is mounted on the toaster housing (12) with this foodstuff cutter (36) to be operable to divide certain foodstuff (18, 126) into two pieces to facilitate its toasting operation. A novel mechanism is included within the toaster (10) to achieve the toasting operation.

10 Claims, 6 Drawing Sheets

TOASTER AND CUTTER

BACKGROUND OF THE INVENTION

1. Field of this Invention

The field of this invention relates to toasters and more particularly to a toaster that in addition to its primary use is designed for cutting, toasting and easier handling of bagels, muffins and other similar types of disc shaped foodstuffs.

2. Description of the Prior Art

In the past, there have been numerous designs for toasters. The most common form of toaster is for slices of bread. The common construction of a toaster for bread slices is that the bread slices enter the toaster through an opening in the top of the toaster, the bread slices are toasted and then the bread slices are ejected from that same opening usually operated by a timing device. The user then manually grasps the bread slices and removes them from the toaster to be consumed.

Within recent years, a type of bakery foodstuff is experiencing greater widespread usage, that foodstuff being bagels and muffins. Both bagels and muffins are denser than typical bread. When a bagel or muffin is toasted, this type of foodstuff retains the heat to a much greater extent than bread. This increases the possibility that upon a user grasping a toasted bagel or muffin from a conventional type of toaster, that the user can actually receive burns on his or her fingers. It would be desirable to design a toaster that also accommodated a bagel or muffin that eliminated the need for physically extracting of the toasted bread, bagel or muffin from the toaster prior to being consumed.

Additionally, bagels and muffins are usually desired to be sliced into two longitudinal halves prior to being toasted. This normally entails the user placing the bagel or muffin on a circumferential edge in an upright manner held by the user's hand, and directing a knife longitudinally through the bagel or muffin attempting to divide the bagel or muffin into two approximately equal halves. This type of cutting procedure is difficult for a great many people and has resulted in a large number of hand cuts. Also, it is not easy for any individual to precisely divide the bagel or muffin into the desired two equal parts. There is a need to incorporate a simplified and safe form of slicing device for a bagel or muffin in conjunction with a toaster that is designed additionally to accommodate bagels or muffins.

SUMMARY OF THE INVENTION

The toaster and cutter of the present invention utilizes a toaster housing and within that toaster housing is located a heating coil element which is deemed to be conventional for the purpose of toasting bread and halves of bagels and muffins. Once the bread or the halves of the bagel or muffin are toasted, such are to fall by gravity from the interior of the toaster through an exit opening and onto a work surface of a planar member. This planar member constitutes in essence a door that is pivotally mounted to the toaster housing with the door being movable prior to any toasting from a position abutting against the toaster housing and closing of the exit opening to a transverse position relative to the toaster housing. It is in this transverse position that the toasted foodstuff will then fall by gravity onto the work surface after being toasted. Mounted on the toaster housing is a foodstuff cutter although the cutter could be manufactured by itself. Incorporated within the foodstuff cutter is a separate container. This container is adapted to support a muffin or bagel in an upright manner and when inserted in conjunction with the foodstuff cutter will free a protected knife blade that can be used to be moved manually longitudinally through the muffin or bagel within the container and slice a muffin or bagel into two relatively equal parts. Once the muffin or bagel is sliced into two parts, the container with the two parts is removed and the two parts of the muffin or bagel manually extracted from the container and then placed within the toaster. Also included within the toaster is a novel mechanism to achieve the toasting operation and automatic dispensing of the toasted foodstuff.

The primary objective of the present invention is to construct a toaster which facilitates the toasting of muffins and bagels in addition to bread and minimizes the possibility of injury to a user due to either the cutting of the foodstuff or due to heat that is retained by the foodstuff after being toasted.

Another objective of the present invention is to correct a frequent injury caused by constructing a toaster which includes a protective cutting device that safely facilitates the manually dividing of a muffin or bagel into two relatively equal parts prior to being toasted.

Another objective of the present invention is to construct a toaster with new desirable features that can be manufactured at a reasonable cost and thereby sold to the ultimate consumer at a reasonable cost.

DETAILED DESCRIPTION OF THE PREFERRED EMBODIMENT

Figure 1:
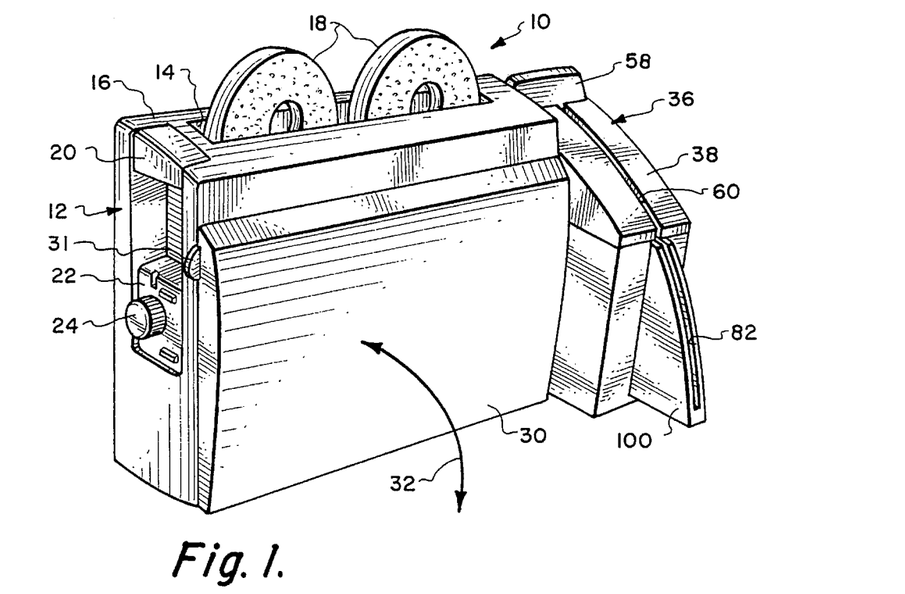
FIG. 1 is an isometric view of the toaster of this invention which is shown in a position about ready to toast two halves of a bagel.
Figure 2:
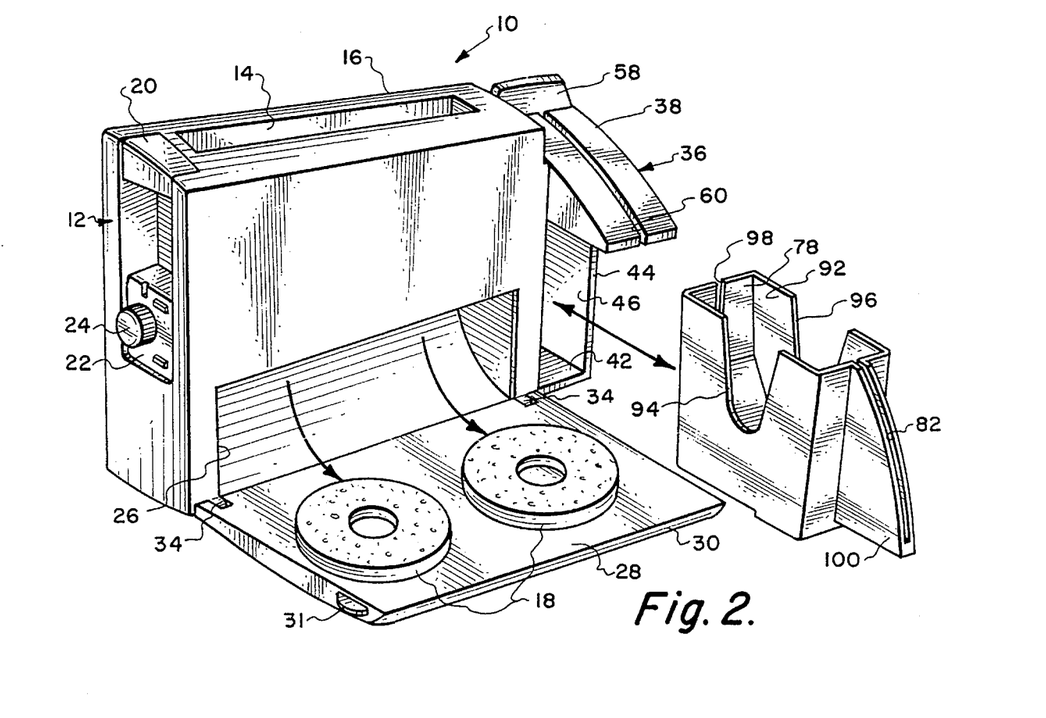
FIG. 2 is an isometric view showing the position of the two halves of the bagel being delivered after toasting and also showing the container of the slicing device being removed.

Referring particularly to the drawing, there is shown in FIG. 1 and 2 the toaster 10 of this invention. The toaster 10 is constructed of a toaster housing 12 which has an access opening 14 mounted in the top surface 16 of the toaster housing 12. The access opening 14 is of such a length as to be able to locate in an in-line position a slice of bread or two halves of a foodstuff 18 that is to be toasted. The foodstuff 18 can comprise a bagel, muffin or even bread slices. The toasting procedure is to occur by the operator pushing downward on handle 20 until the handle 20 will assume a position substantially adjacent to switch box 22. The switch box 22 includes a knob 24 which can be adjusted by the user in order to vary the toasting time of the halves of the foodstuff 18.

After the foodstuff 18 has been toasted within the toaster housing 12, the handle 20 will automatically spring back to the position shown in FIGS. 1 and 2. Also, the foodstuff 18 will then fall naturally by gravity through the exit opening 26 and come to rest on a work surface 28 of a planar member 30. Planar member 30 is in essence similar to a cutting board which also functions as a door to close off exit opening 26 when the planar member 30 is not to be operated and is located in an abutting position as shown in FIG. 1 with the toaster housing 12. From the position in FIG. 1, the planar member 30 can be moved manually by handle 31 as indicated by arrow 32 to a transverse position relative to the toaster housing 12. Normally the toaster housing 12 will be resting on a counter or table with the planar member 30 being moved to also rest on the counter or table. The position of the planar member 30 in FIG. 2 would normally be located horizontal while the planar member 30 in FIG. 1 would normally be located vertically. The planar member 30 is attached to the toaster housing 12 by means of hinge joints 34. It is to be understood that the planar member 30 may be disconnectable from the hinge joints 34 in order to facilitate cleaning.

Mounted on one of the side walls of the toaster housing 12 is a foodstuff cutter 36. The foodstuff cutter 36 includes a top wall 38, a back wall 40, a bottom wall 42 and a side wall 44. Between the toaster housing 12 and the side wall 44 there is formed a compartment 46. The bottom wall 42 includes a shelf 48. Included within the shelf 48 is a groove 50. Mounted directly adjacent the groove 50 is a cutting blade 52. The cutting blade 52 has a novel shaped cutting edge 51 to facilitate cutting of the foodstuff 18.

The cutting blade edge 51 includes a plurality (four in number) of sharp points 53. Each sharp point 53 is formed by an acute angle portion of the cutting blade 52. This type of cutting blade edge 51 has been found to easily and completely sever (not tear) a bagel or muffin. Other cutting blades just tear at the bagel achieving an unsatisfactory cut. The lower end of the cutting blade 52 is attached to a coil spring 54. The coil spring 54 is mounted on mounting block 56 which, in turn, is fixedly mounted on the shelf 48. The upper end of the cutting blade 52 extends through slot 60 on top wall 38 and is connected to handle 58. The interior surface of the handle 58 includes a hole 62. The hole 62 is to connect with rod 64. Rod 64 is conducted through appropriate aligned holes formed within top wall 38 and intermediate wall 66. Intermediate wall 66 is mounted between the top wall 38 and the bottom wall 42. The intermediate wall 66 is integrally formed to the foodstuff cutter 36.

Figure 3:
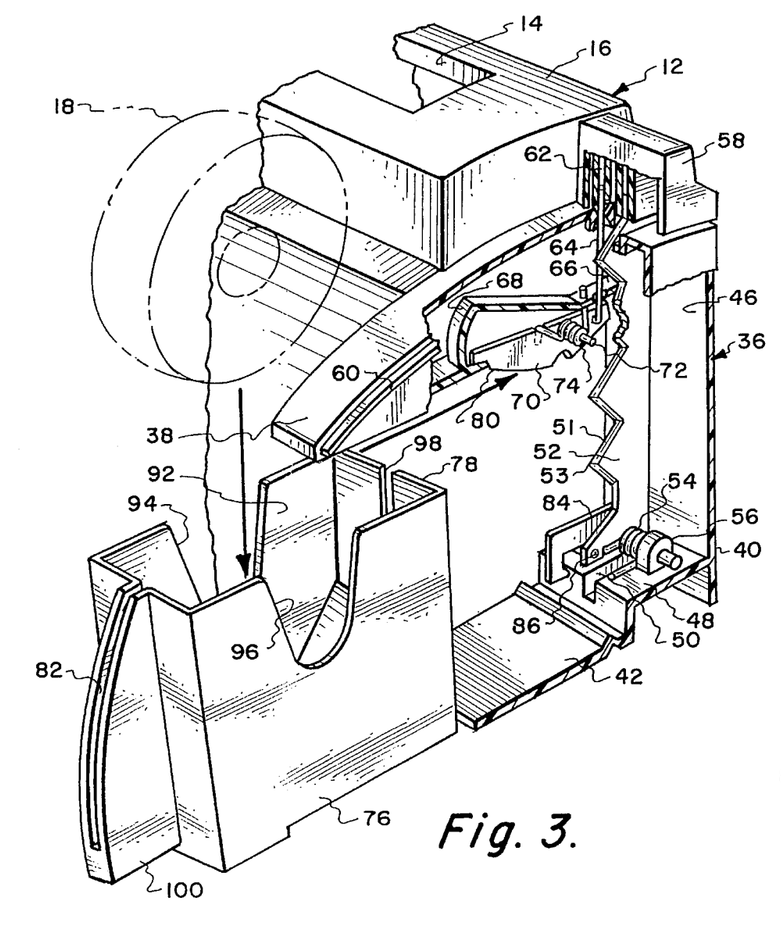
FIG. 3 is an isometric view, partly in cross section, of the cutter incorporated in the toaster of the present invention showing the container of the cutter to be disengaged therefrom and depicting a bagel being placed in the container.

The intermediate wall 66 includes an outwardly extending section 68. Mountable within the outwardly extending section 68 is a locking pawl 70. The locking pawl 70 is pivotally mounted by means of pivot shaft 72 to the toaster housing 12. Mounted on the pivot shaft 72 is a coil spring 74. One end of the coil spring 74 is fixedly mounted into the intermediate wall 66 with the opposite end of the coil spring 74 being mounted in a hole formed within the locking pawl 70. The coil spring 74 exerts a continuous bias tending to locate the locking pawl 70 in a downward or lowered position as is clearly shown in FIG. 3 of the drawings. The inner or lower end of the rod 64 is mounted within a second hole formed within the locking pawl 70. Under the normal, at-rest, biasing action of the coil spring 74, with the locking pawl 70 shown in FIG. 3, the rod 64 is located in an upwardly extending position protruding from the top wall 38 which will locate a portion of the rod 64 within the hole 62 formed within the handle 58. This will lock in position the handle 58 and prevent its movement to perform a cutting operation. The reason for this is that the container 76 is not located within the compartment 46. When the container 76 in FIG. 3 is not so located within the compartment 46, it is important that, as a safety feature, the operation of the knife blade 52 be prevented to avoid injury to a human and particularly a child who may be playing with the foodstuff cutter 36.

Figure 4:
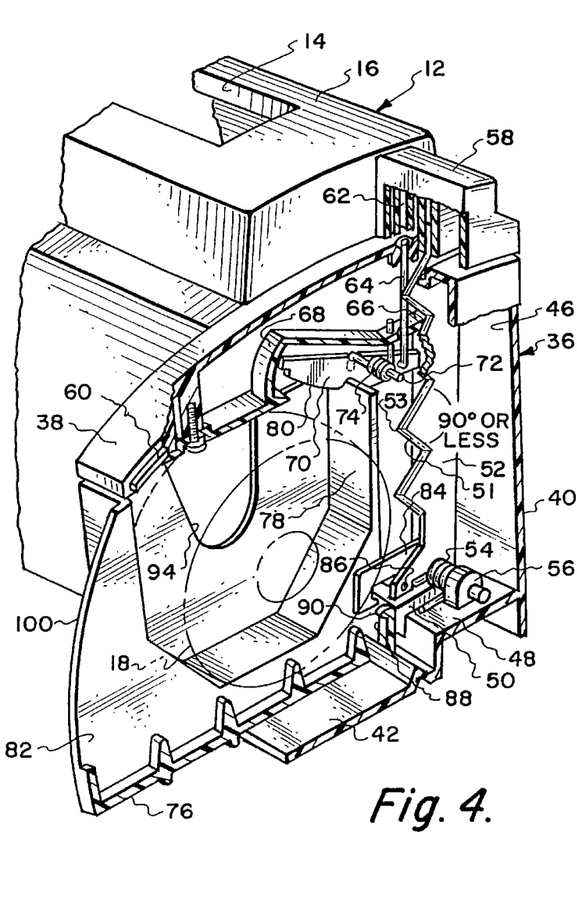
FIG. 4 is an isometric view, partly in cross section, similar to FIG. 3 but showing the container of the cutter in the installed position and with the cutting blade of the cutter in its normal at-rest position.

Upon insertion of the container 76 fully within the compartment 36, the back wall 78 will come into contact with the cam surface 80 of the locking pawl 70. This will cause the locking pawl 70 to pivot about the pivot rod 72 to the upper position shown in FIG. 4. At the same time, the rod 64 will be lineally moved in a downward direction and disengage from the hole 62. Therefore, the handle 58 is no longer locked in position and the cutting blade 52 is capable of being pivoted through a cutting operation until the cutting blade 52 reaches its maximum position of movement shown in FIG. 5. During movement of the cutting blade 52, the upper end of the cutting blade 52 will pass within slot 60 and then through slot 82 of the container 76. Also, the lower end of the cutting blade 52 will be located within the groove 50. The container 76 encloses the cutting blade 52 which prevents any injury to the operator with cutting of the foodstuff 18 being only permitted.

Mounted on the foodstuff cutter 36 is a latching hook 84. This latching hook 84 is free to pivot a limited distance between an upward position shown in FIG. 3 and a lower position shown in FIG. 5. A pin 86 is mounted on the lower end of the cutting blade 52. It is the function of the pin 86 to have the latching hook 84 rest thereon when the container 76 is not located within the compartment 46. This will hold the latching hook 84 in a disengaging position. The back wall 78 of the container 76 includes a recess 88. Located within that recess 88 is a fixed hook 90. The fixed hook 90 is part of the container 76. When the container 76 is properly positioned within the compartment 46 and the cutting blade 52 is free to be moved, upon initial movement of the cutting blade 52 by manually contacting handle 58 and moving the cutting blade 52, the latching hook 84 will be released and be permitted to move within the compartment 88 until the latching hook 84 engages with the fixed hook 90. This will lock in position the compartment 76 within the compartment 46 for as long as the cutting blade 52 is being moved. This will prevent the container 76 from being removed from the compartment 46 which could result in the cutting blade 52 causing injury to a human.

The container 76 has an interior chamber 92 into which is to be located a foodstuff 18 (not shown). The foodstuff 18 is located in the interior chamber 92 in an on-edge position. The width of the compartment 92 should be such that a reasonably close fit is established between the foodstuff 18 and the compartment 92. The side walls of the container 76 include oppositely oriented recesses 94 and 96 which are to function as finger and thumb access openings facilitating manual removal of the foodstuff 18 after being appropriately cut by the knife blade 52. The container 76 also includes a slot 98 formed within the back wall 78 of the container in order to provide access of the cutting blade 52 to within the interior compartment 92.

The operation of the foodstuff cutter 36 is as follows: The container 76 is removed from the compartment 46 and a foodstuff 18 is placed into the interior compartment 92. Removal is accomplished by manually grasping a handle 100 mounted on the container 76. With the foodstuff 18 so inserted within the compartment 92, the user will replace the container 76 into the compartment 46 which will cause the latching pawl 70 to be pivoted in the upward direction and disengage rod 64 from hole 62 of handle 58. The user then proceeds to initiate pivoting movement of the cutting blade 52 by manually moving of the handle 58 along the top wall 38. This will result in the latching hook 84 to be dropped within the compartment 88 with latching hook 84 engaging with fixed hook 90. Continual movement of the cutting blade 52 will result in severing of the foodstuff 18 into the two halves that are shown in FIG. 1 and 2 of the drawings. The handle 58 is then released at which time the spring 54 will automatically cause the cutting blade 52 to be pivoted back to its at-rest position as is shown in FIG. 1 to 4 of the drawings. When the cutting blade 52 is so located in this position, the pin 86 will be moved against the latching hook 84 disengaging the hook 84 from the fixed hook 90. This will now permit the container 76 to be removed from the compartment 46 and the foodstuff 18 to be removed from the interior compartment 92.

Figures 5, 6, 7:
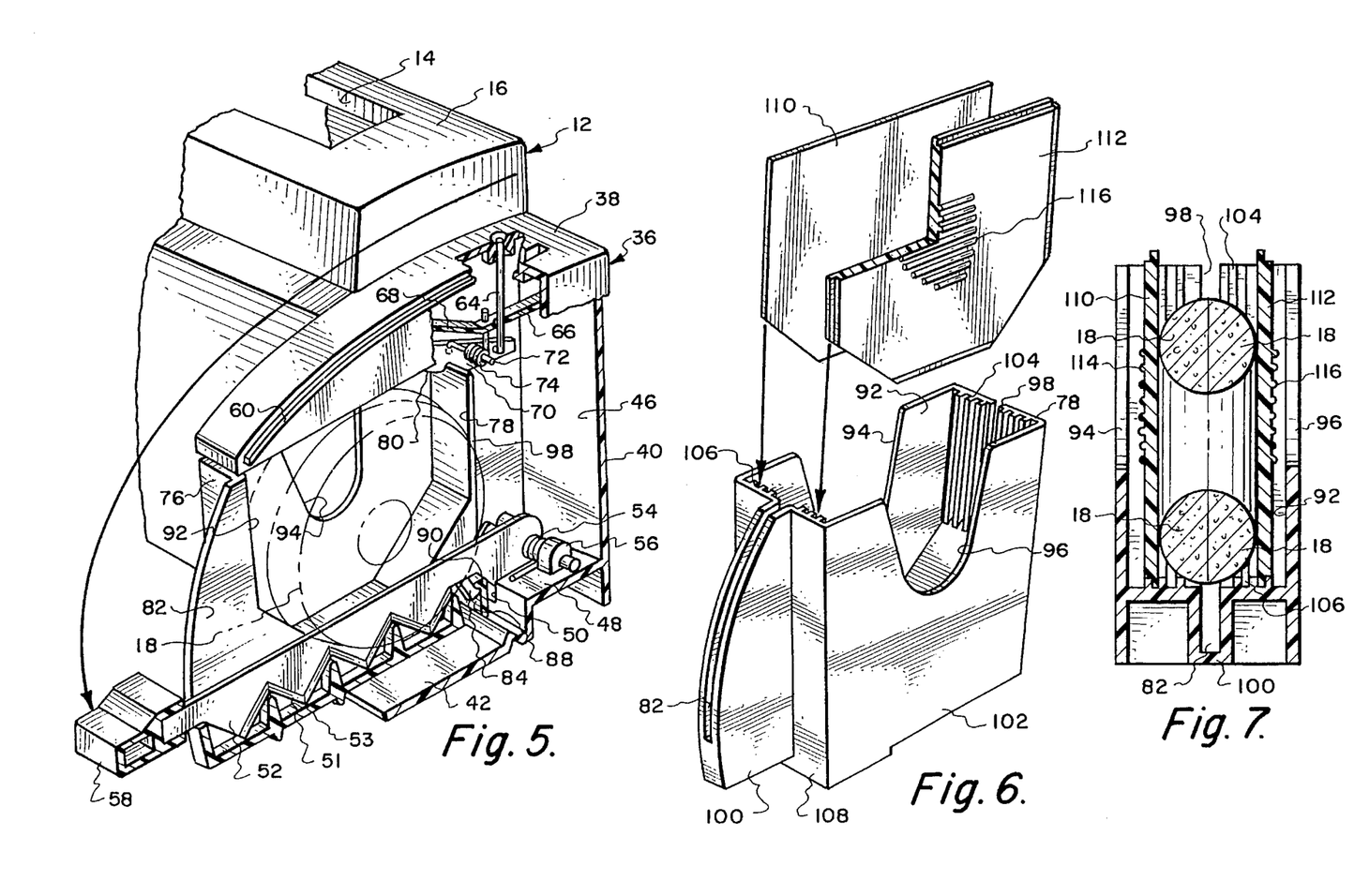
FIG. 5 is a view similar to FIG. 4, again, partly, in cross section, showing the cutting blade in its most downward position after having severed a bagel or muffin into two parts.
FIG. 6 is an isometric view of a modified version of the container incorporated within the cutter of the present invention.
FIG. 7 is a transverse cross sectional view through the container of FIG. 6 depicting the container being used in conjunction with a bagel prior to being sliced in two parts by the cutter.

Referring particularly to FIGS. 6 and 7 of the drawings there is shown a modified form of container 102 which is basically similar to the container 76 with like numerals referring to like parts between containers 76 and 102. However, interiorly of the back wall 78 there is included a series of vertical slots 104. A similar series of vertical slots 106 are formed on the interior surface of the front wall 108 of the container 102. Slidably connected within an aligned series of slots 104 and 106 is a partition 110. It is the function of partitions 110 and 112 to permit manual varying of the width of the compartment 92 so that when a foodstuff 18 is located within the compartment 92, there will be a snug fit established and the foodstuff 18 will be centrally located within the compartment 92. Central location of the foodstuff 18 is important so that, when the knife blade 52 is moved through the cutting position, the foodstuff 18 will be sliced in approximately two equal halves. It is to be understood that the partitions 110 and 112 can be located in any pair of aligned slots 104 and 106. Partitions 110 and 112 are identical but reversed. If the foodstuff 18 is of sufficient width to occupy a substantially snug position within the compartment 92, then the partitions 110 and 112 will not be used. Partitions 110 and 112 include exterior ridges 114 and 116 respectively. These ridges 114 and 116 facilitate manual insertion and removal of the partitions 110 and 112 within the compartment 92 by having the operator's fingers contacting ridges 114 or 116.

Referring particularly to FIGS. 8–13 of the drawings there is shown the mechanism to achieve the toasting operation and dispensing of the toasted item within the toaster 118. The toaster 118 of FIGS. 8–13 is basically similar to toaster 10 with the exception that there would be an exterior housing (not shown) enclosing the mechanism that is observable. The toaster 118 includes an exterior toaster housing 120 which is observable in the drawings which is similar to toaster housing 12. An access opening 122 is formed in the exterior housing with this access opening 122 being located within the top surface 124 of the exterior housing 120. Again the access opening 122 is of sufficient length so as to be able to locate in an in-line position the foodstuff 126 that is to be toasted. Again the toasting procedure is to occur by the operator pushing downward on a handle (not shown) which is attached to lever 128. The handle would be basically similar to handle 20 and to operate in substantially the same manner. It is to be understood that the left end of the lever 128 has been removed in the drawings, the end to which the handle would be attached, in order to clearly illustrate the mechanism shown in FIGS. 8–13.

The inner end of the lever 128 is pivotally mounted by a headed rivet to a sheet metal mechanism housing 132. The mechanism housing 132 is slidingly mounted on a pair of parallel, spaced-apart, vertical mounting rods 134 and 136. The mounting rods 134 and 136 are fixedly secured to a top plate 138 which is integral with the top surface 124 and a bottom plate 140 which is integral with the bottom surface (not shown) of the toaster 118. Bottom plate 140 is positioned directly adjacent base plate 142. The rods 134 and 136 are fixed in position between the top plate 138 and the bottom plate 140. The mechanism housing 132 includes horizontal extension 144 within which is located a hole through which the rod 134 passes. The mechanism housing 132 also includes similar horizontal extensions 146 and 148, each of which includes appropriate holes through which the rod 136 passes. A coil spring 150 is mounted about the rod 134 and one end of the coil spring 150 abuts against the horizontal extension 144 with the opposite end of the coil spring 150 being capable of abutting against the top plate 138. It is to be understood that in some positions the coil spring 150 is spaced and not engaged with the top plate 138. There is located a separate coil spring 152 which has hooked ends with one hooked end being fixedly attached to the horizontal extension 148 and the opposite hooked end being fixedly attached to the top plate 138. The function of the coil springs 150 and 152 will be explained further on in the specification.

Pivotally mounted by a pivot pin (not shown) to the mechanism housing 132 is a connecting lever 154. The outer end of the connecting lever 154 is mounted within a hole 156 formed within the lever 128. The opposite end of the connecting lever 154 is pivotally mounted to the mechanism housing 132 with this pivot connection not being shown. A hook arm 158 is pivotally mounted on the connecting lever 154. The hook arm 158 is actually free swinging by gravity with the lower end of the hook arm 158 including a cam surface 160. The hook arm 158 includes a hook engaging section 162.

Mounted on the base plate 142 and extending upwardly therefrom is a detent member 164. The detent member 164 includes a upper end formed into detent 166. Upon manual downward pressure being applied to the handle (not shown) and lever 128, the mechanism housing 132 slides downwardly on the rods 134 and 136 from the position shown in FIG. 8 to the lowermost position shown in FIG. 9. In this lowermost position, the cam surface 160 will come into contact with the detent 166 which will cause the hook member 158 to pivot about the connecting lever 154. This will permit the detent 166 to then engage with the hook engaging section 162. Simultaneously, the toasting element is heated and held for the specified time. The coil spring 152 will be held in the fully stretched position (toasting position) by the engagement of the detent 166 with the hook engaging section 162. An electromagnet 168 will have a shaft 170 that will be extended to apply pressure against the hook arm 158 keeping the detent 166 in engagement with the hook engaging section 162. Electricity to the electromagnet is supplied by an electrical circuit being completed when block 172 presses against electrical contacts 174 and 176 which in turn come into physical connection with contacts 178 and 180, respectively. Also, appropriate electrical current will be supplied to the heating element (not shown) located within the toaster 118. Appropriate electrical energy will be supplied to the electrical circuit board 182 on which the electromagnet 168 is mounted. A potentiometer is associated with the circuit board 182 which is to be manually operated by a knob (not shown) which is mounted on shaft 184. Manual movement of the potentiometer by shaft 184 will vary the toasting time.

When the toasting time is completed, the electrical circuit will be disengaged by an appropriate timing mechanism (not shown) on the circuit board 182. When this electrical circuit is disconnected, the shaft 170 of the electromagnet 168 will then retract. The spring bias of coil spring 152 will then cause the hook arm 158 to pivot toward the circuit board 182 disengaging the hook engaging section 162 from detent 166. This will then permit the mechanism housing 132 to be moved in an upward direction by spring 152 on the rods 134 and 136. The function of the spring 150 is to act as a buffer spring when the mechanism housing 132 is moved to its uppermost position and prevents the mechanism from slamming hard into the top plate 138.

Figures 9, 12:
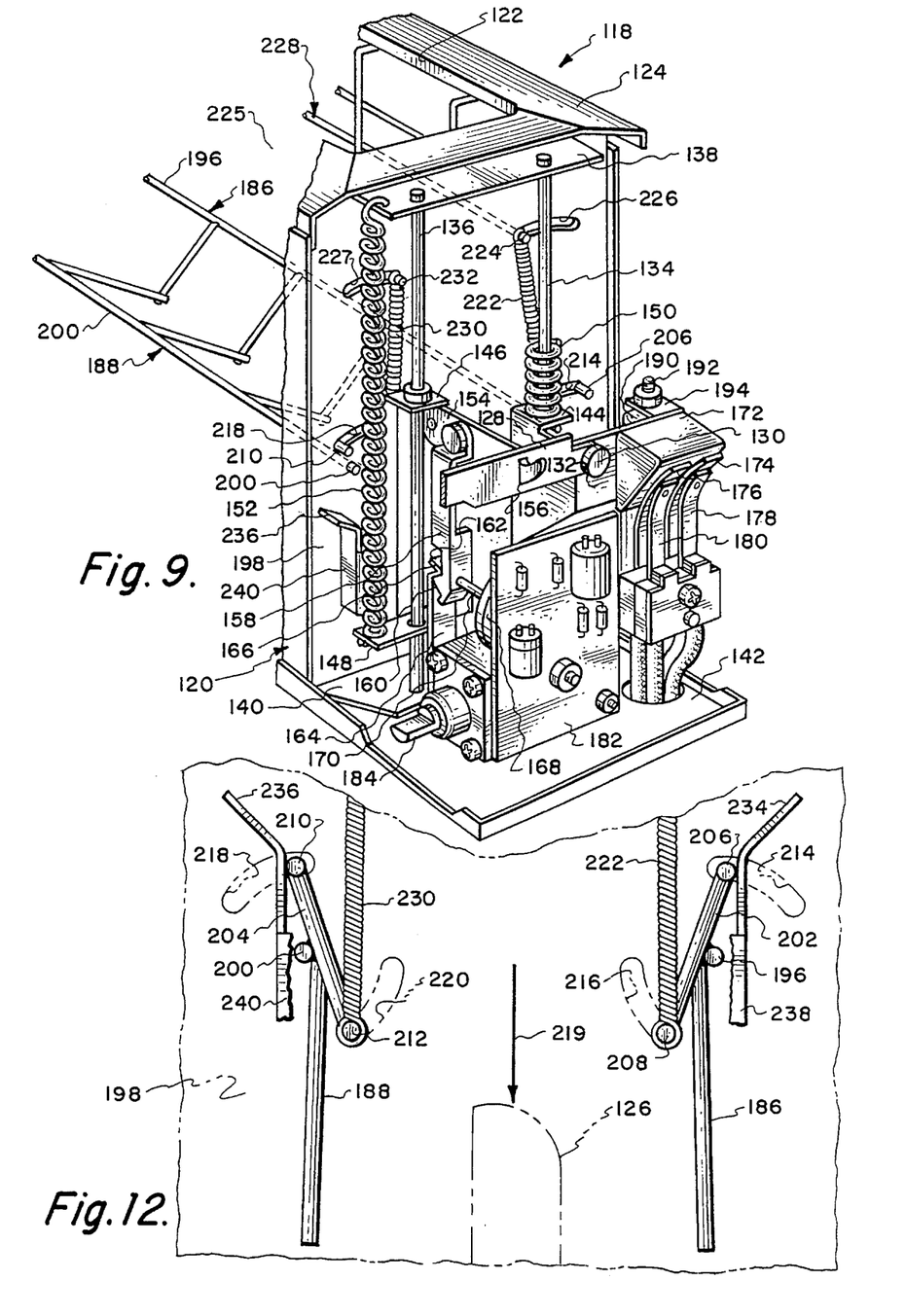
FIG. 9 is a view similar to FIG. 8 showing the mechanism in its most downward operating position holding the bread, bagel or muffin in its toasting location.
FIG. 12 is a view similar to FIG. 11 but showing the portion of the mechanism in the dispensing position.
Figure 10:
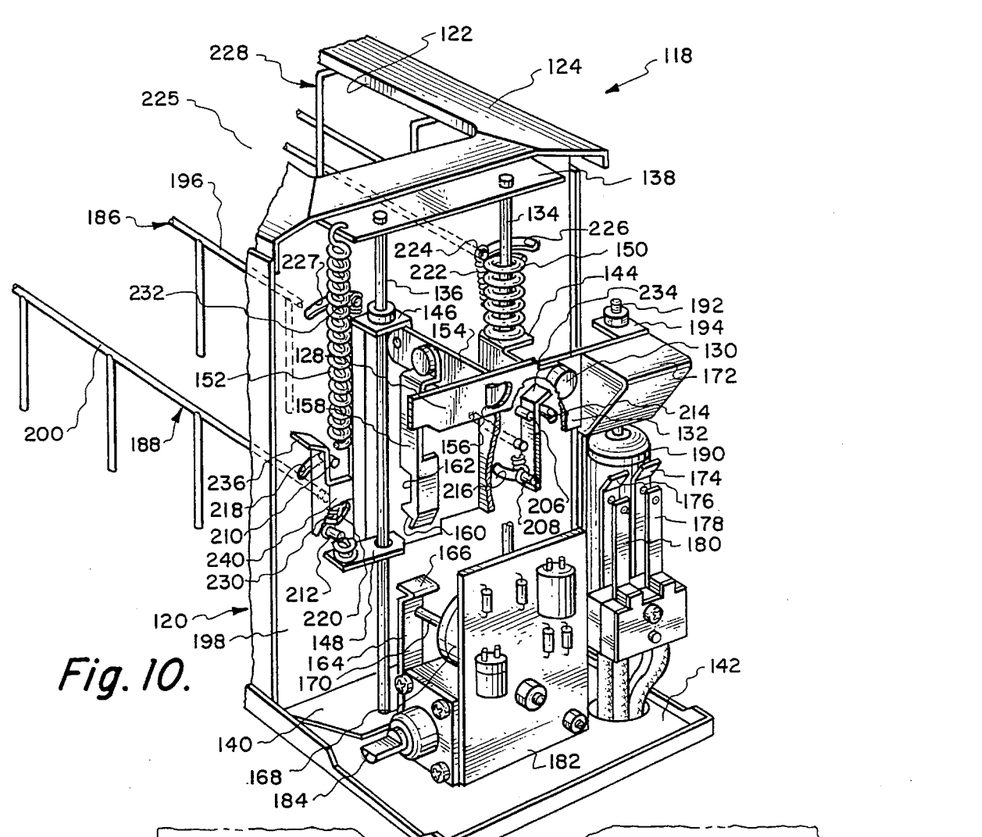
FIG. 10 is a view similar to FIG. 8 but showing the mechanism in the dispensing position with the foodstuff having been dispensed.

It is also desirable that during this upward movement that this upward movement occurs slowly so as to give adequate time for the foodstuff to fall free of and become completely disengaged from the trap door racks 186 and 188 which support the bread, bagel or muffin as it is being toasted. In other words when the trap door racks 186 and 188 move to the open position as shown in FIGS. 10 and 12, it is important that such close slowly rather than almost instantaneously. This slow closing is caused by air cylinder 190 which is mounted on the base plate 142. Inside the air cylinder 190 is a piston (not shown) which is connected to piston rod 192. The piston rod 192 is fixed to horizontal extension 194 of the mechanism housing 132. The result is the air cylinder 190 functions as a damper only permitting slow upward movement of the mechanism housing 132 providing adequate time for the foodstuff 126 to fall through the toaster 118 after toasting and slide onto the work surface 28.

The trap door rack 186 has a main rod 196 which extends through a hole formed within sidewall 198 of the toaster housing 120. It is to be understood that on the opposite end (not shown) of the toaster 118 there is a similar sidewall into which the opposite end of the main rod 196 would also be mounted within an appropriate hole (not shown). It is to be understood that the trap door rack 188 also includes a main rod 200 which is similarly mounted in a hole within the sidewall 198 and in the opposite sidewall (not shown).

Figure 11:
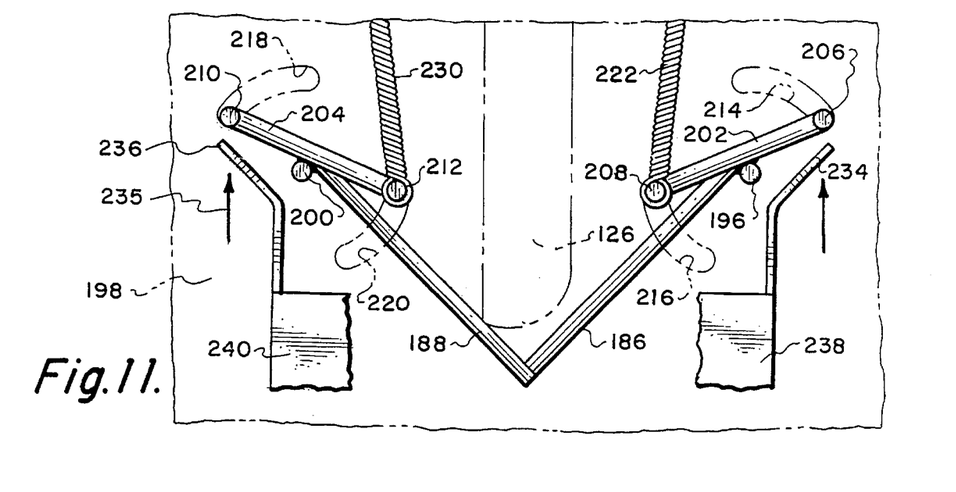
FIG. 11 is a schematic view of a portion of the mechanism included within the toaster of the present invention showing the portion of the mechanism in the toasting position.
Figure 13:
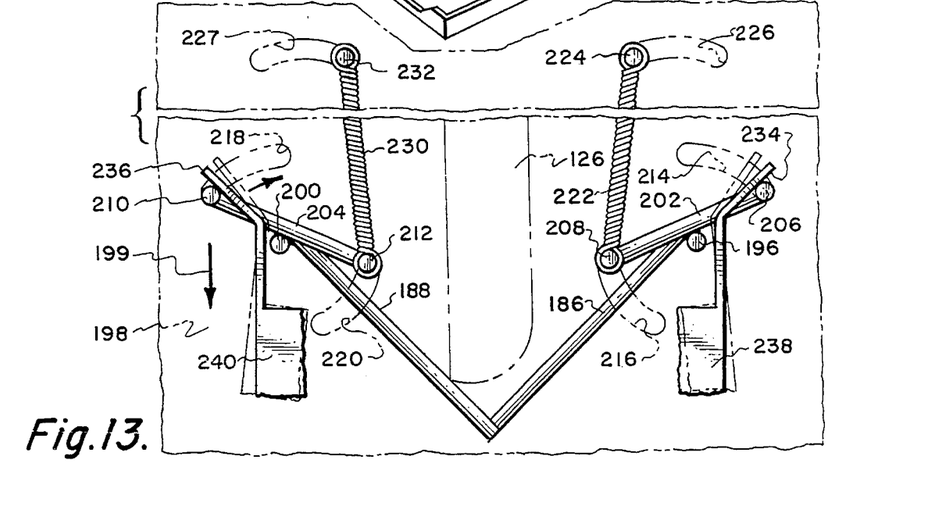
FIG. 13 is a view similar to FIG. 11 showing the portion of the mechanism in a position of movement to the toasting position.

In FIGS. 11 and 12, welded to the portion of the main rod 196 and located directly adjacent to sidewall 198 is a connecting arm 202. A similar connecting arm 204 is similarly secured to the main rod 200. The connecting arm 202 terminates in ends 206 and 208 with connecting rod 204 terminating in ends 210 and 212. The end 206 slides within limited distance slot 214 formed within the sidewall 198. End 210 rides within a similar type of slot 218 formed within the sidewall 198. The end 208 rides within a slot 216, with end 212 riding in slot 220 that is also formed within the sidewall 198. The slots 214 and 216 only permit pivoting movement of the trap door rack 186 from the position shown in FIG. 8 to the position shown in FIG. 10. In a similar manner the slots 218 and 220 only permit pivoting movement of the trap door rack 188 from the position shown in FIG. 8 to the position shown in FIG. 10.

Connected to the one end 208 of connecting arm 202 is a coil spring 222. The opposite end of the coil spring 222 is connected to an end 224 which is movably mounted within the confines of a limited length slot 226 also formed within the sidewall 198. The end 224 is part of a side rack 228 which is mounted within the toasting chamber 225 of the toaster 118.

A separate coil spring 230 is connected to end 212 with the opposite end of spring 230 being connected to end 232 of a side rack (not shown) which is also mounted within the toasting chamber 225 and located opposite the side rack 228. End 232 is slidable within slot 227 formed in sidewall 198. It is to be understood that the side racks are movable toward and away from each other so that when the foodstuff 126 is inserted within the toasting chamber 225 that the side racks will either move toward or away from each other to accommodate the width of a foodstuff 126 that has been located within the toasting chamber 225. The springs 222 and 230 function to locate the side racks to the closest possible position to each other. Movement of the side racks outwardly is accomplished by merely inserting of a wider width foodstuff 126 between the side racks which will automatically cause the side racks to move in a direction away from each other. It only takes a very small amount of force to have the side racks move away from each other but the side racks have enough biasing force, caused by the springs 222 and 230, to hold the foodstuff 126 in a perfectly upright position.

The coil springs 222 and 230 also serve the additional function of tending to locate the trap door racks 186 and 188 in the closed position which is shown in FIGS. 8, 9, 11 and 13. The springs 222 and 230 are of sufficient force to maintain the trap door racks 186 and 188 in the closed position upon foodstuff 126 being inserted within the toasting chamber 225 and resting on the trap door racks 186 and 188.

Figure 8:
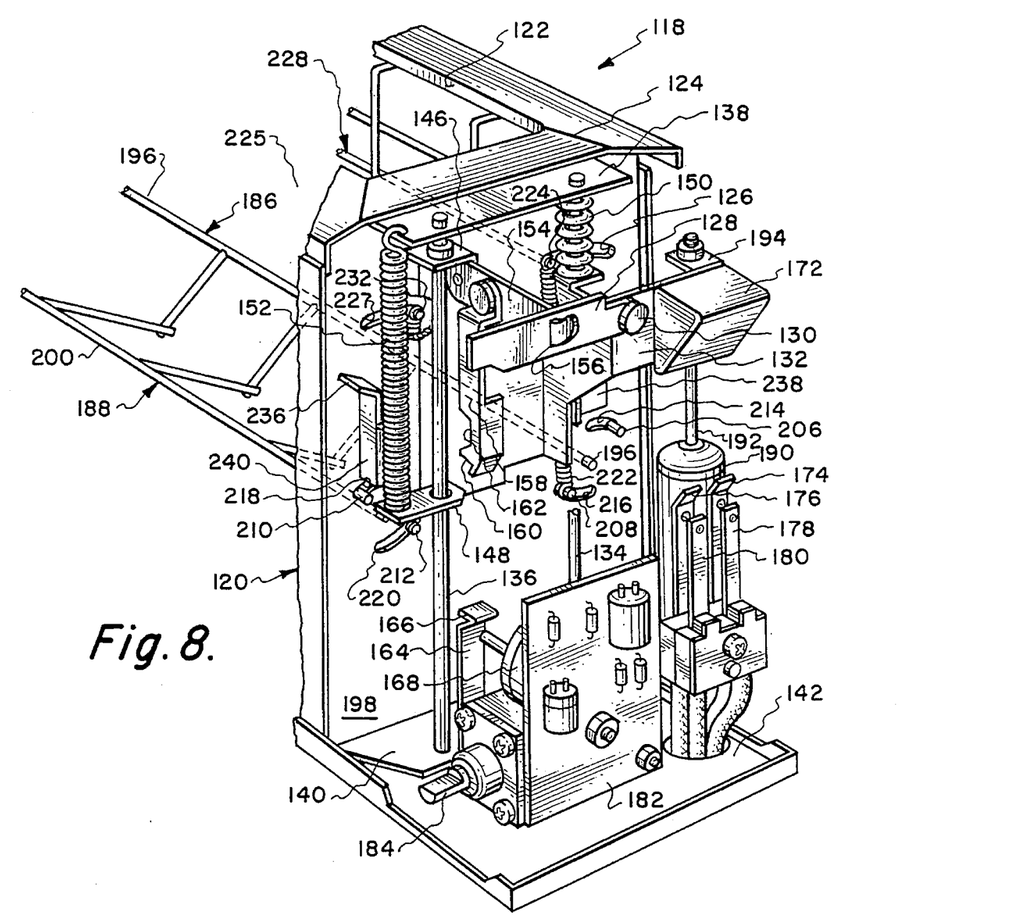
FIG. 8 is a cutaway isometric view through the toaster housing of the present invention showing the mechanism in its most upward position ready to receive the bread, muffin or bagel for toasting.

When the mechanism housing 132 is manually moved from the upper position shown in FIG. 8 to the lower position shown in FIG. 9 to start toasting, thin deflectable member 234, shown in FIGS. 11, 12, will come into contact with end 206 with the thin deflectable member 236 coming into contact with end 210. This is clearly shown in FIG. 13 with the direction of movement being depicted by arrow 199. Thin deflectable member 234 is mounted on thin member housing 238 which is fixed to the mechanism housing 132 and travels with it. In a similar manner the thin deflectable member 236 is mounted on a thin member housing 240. The housing 240 is again fixedly mounted to the mechanism housing 132 and travels with it. The thin deflectable member 234 deflects as it passes by end 206. In the same manner the thin deflectable member 236 deflects as it passes by the end 210. These deflected positions are shown in dotted lines in FIG. 13.

After the toasting has been completed and the mechanism housing 132 is automatically released from its detent 166 and starts to move upward, depicted by arrow 235 in FIG. 11, thin deflectable member 234 comes into contact with the undersurface of the end 206 and thin deflectable member 236 comes into contact with the undersurface of the end 210. This will cause the ends 206 and 210 to be moved within their respective slots 214 and 218 with ends 208 and 212 to be moved within their respective slots 216 and 220. This results in the trap door racks 186 and 188 being pivoted to the open position as shown in FIGS. 10 and 12 releasing the foodstuff 126 from the toasting chamber 225 as depicted by arrow 219 in FIG. 12. The result is the end 206 will be slid along the inside surface of the thin deflectable member 234 with the end 210 similarly sliding along the inside surface of the thin deflectable member 236. As the mechanism housing 132 approaches its uppermost position, the end 206 will become spaced from the thin member housing 238 which will then result in the trap door rack 186 pivoting back to the closed position due to the biasing action of the coil spring 222. In a similar manner the end 210 will become disengaged from the thin member housing 240 which will result in the trap door rack 188 also pivoting to the closed position. Now the ends 206 and 210 are in the position to be again contacted by the outside wall surfaces of their respective thin deflectable members 234 and 236 when the mechanism housing 132 is moved from the upper position to the lower position and the process is repeated. When going from the lower to the upper position of the mechanism housing 132, the ends 206 and 210 must move their respective distances to get by their respective thin member housings 238 and 240. This length of movement holds the trap door racks 186 and 188 in the open position for a sufficient length of time to make sure that the foodstuff 126 fall completely free from the toasting chamber 225.

What is claimed is:

1. A toaster for toasting foodstuff items, said toaster comprising:

a toaster housing, an access opening formed in said toaster housing into which a foodstuff item is to be located, an exit opening formed in said toaster housing, said exit opening being spaced from said access opening, said exit opening being located at a lower level than said access opening, whereby a foodstuff item that has been toasted will fall by gravity from within said toaster housing through said exit opening; and a work surface formed on a planar member, said planar member being mounted on said toaster housing and located directly adjacent said access opening, whereby a toasted foodstuff item will be automatically deposited on said work surface upon being dispensed from said toaster housing, said planar member being movable relative to said toaster housing between a storage position and a using position; and a foodstuff cutter being mounted on said toaster housing, said foodstuff cutter including a protective foodstuff cutter housing.

2. The toaster as defined in claim 1 wherein:

a foodstuff supporting container, said foodstuff supporting container being connectable with said foodstuff cutter housing locating said foodstuff supporting container in an installed position, said foodstuff supporting container being removable from said foodstuff cutter housing locating said foodstuff supporting container in a spaced relationship relative to said foodstuff cutter housing.

3. The toaster as defined in claim 2 wherein:

said foodstuff cutter housing including a cutting blade, said cutting blade being movable only when said foodstuff supporting container is located in said installed position.

4. The toaster as defined in claim 3 wherein:

said foodstuff supporting container including size adjustment means in order to adjust the size of said foodstuff supporting container to accommodate to different sizes of foodstuffs.

5. The toaster as defined in claim 3 wherein:

said cutting blade being locked in position when said foodstuff supporting container is disengaged from said foodstuff cutter housing thereby preventing movement of said cutting blade.

6. A toaster comprising:

a toaster housing having an access opening and an exit opening, said access opening being located at a higher elevation than said exit opening when said toaster is in operation, a toasting chamber located between said access opening and said exit opening, whereby a foodstuff item to be toasted is to be inserted through said access opening within said toasting chamber and after being toasted is dispensed through said exit opening;

a trap door assembly mounted within said toasting chamber, said trap door assembly being movable between a closed position and an open position, with said trap door assembly in said closed position a foodstuff item will be retained within said toasting chamber, with said trap door assembly in said open position the foodstuff item will be dispensed from said toasting chamber;

a mechanism to open said trap door assembly, said mechanism being movable between a foodstuff retention position and a foodstuff dispensing position, said mechanism including a latching means for holding said mechanism in said foodstuff dispensing position to obtain toasting of a foodstuff within said toasting chamber; and said mechanism including delay means for slowing the movement of said trap door assembly from said open position to said closed position thereby providing sufficient time to insure the dispensing of a toasted foodstuff from said toasting chamber.

7. A toaster comprising:

a toaster housing having an access opening and an exit opening, said access opening being located at a higher elevation than said exit opening when said toaster is in operation, a toasting chamber located between said access opening and said exit opening, whereby a foodstuff item to be toasted is to be inserted through said access opening within said toasting chamber and after being toasted is dispensed through said exit opening;

a trap door assembly mounted within said toasting chamber, said trap door assembly being movable between a closed position and an open position, with said trap door assembly in said closed position a foodstuff item will be retained within said toasting chamber, with said trap door assembly in said open position the foodstuff item will be dispensed from said toasting chamber;

a mechanism to open said trap door assembly, said mechanism being movable between a foodstuff retention position and a foodstuff dispensing position, said mechanism including a latching means for holding said mechanism in said foodstuff dispensing position to obtain toasting of a foodstuff within said toasting chamber; and said toasting chamber including side racks, said side racks to provide lateral support for the foodstuff as it is being toasted, said side racks being automatically adjustable toward and away from each other from a minimum width position to a maximum width position respectively increasing and decreasing the width of said toasting chamber according to the various thicknesses of foodstuff items that are inserted within said toasting chamber.

8. The toaster as defined in claim 7 wherein:

said side racks being connected to a coil spring assembly, said coil spring assembly exerting a continuous bias to said side racks tending to locate said side racks in said minimum width position, said coil spring assembly being connected to said trap door assembly, said coil spring assembly exerting a continuous bias tending to locate said trap door assembly in said closed position.

9. The toaster as defined in claim 8 wherein:

said mechanism including deflectable members, said deflectable members to cause movement of said trap door assembly from said closed position to said open position, said deflectable members being deflected by said trap door assembly during movement of said mechanism from said inactive position to said toasting position.

10. A toaster comprising:

a toaster housing having an access opening and an exit opening, said access opening being located at a higher elevation than said exit opening when said toaster is in operation, a toasting chamber located between said access opening and said exit opening, whereby a foodstuff item to be toasted is to be inserted through said access opening within said toasting chamber and after being toasted is dispensed through said exit opening;

a trap door assembly mounted within said toasting chamber, said trap door assembly being movable between a closed position and an open position, with said trap door assembly in said closed position a foodstuff item will be retained within said toasting chamber, with said trap door assembly in said open position the foodstuff item will be dispensed from said toasting chamber;

a mechanism to open said trap door assembly, said mechanism being movable between a foodstuff retention position and a foodstuff dispensing position, said mechanism including a latching means for holding said mechanism in said foodstuff dispensing position to obtain toasting of a foodstuff within said toasting chamber; and said mechanism including deflectable members, said deflectable members to cause movement of said trap door assembly from said closed position to said open position, said deflectable members being deflected by said trap door assembly during movement of said mechanism from said inactive position to said toasting position.

* * * * *

UNITED STATES PATENT AND TRADEMARK OFFICE
CERTIFICATE OF CORRECTION

PATENT NO.   :   5,522,306
DATED        :   June 4, 1996
INVENTOR(S)  :   Robert A. DeMars It is certified that error appears in the above-indentified patent and that said Letters Patent is hereby corrected as shown below:

Claim 6, line 41, delete "dispensing" and insert ---retention---.

Claim 7, line 21, delete "dispensing" and insert ---retention---.

Claim 10, line 21, delete "dispensing" and insert ---retention---.

Signed and Sealed this

Twenty-sixth Day of December, 2000

Attest:

Q. TODD DICKINSON

Attesting Officer

Director of Patents and Trademarks